US012801973B2

(12) United States Patent
Singh

(10) Patent No.: US 12,801,973 B2
(45) Date of Patent: Nov. 17, 2026

(54) DISTRIBUTED QUANTUM COMPUTING WITH BLOCKCHAIN

(71) Applicant: Bank of America Corporation, Charlotte, NC (US)

(72) Inventor: Shailendra Singh, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 245 days.

(21) Appl. No.: 18/404,152

(22) Filed: Jan. 4, 2024

(65) Prior Publication Data

US 2025/0225423 A1 Jul. 10, 2025

(51) Int. Cl.
*G06N 10/80* (2022.01)
*G06F 8/40* (2018.01)

(52) U.S. Cl.
CPC ............... *G06N 10/80* (2022.01); *G06F 8/40* (2013.01)

(58) Field of Classification Search
CPC .................................. G06F 8/40; G06N 10/80
USPC ................................. 717/120–123, 127, 131
See application file for complete search history.

(56) References Cited

U.S. PATENT DOCUMENTS 11,379,749 B2 * 7/2022 Oliver .................... G01R 29/26
11,652,605 B2 * 5/2023 Turner .................. H04L 9/0643 380/37
11,756,357 B2 9/2023 Carter
12,169,825 B2 * 12/2024 Richter ................. G06F 16/285
12,417,464 B2 * 9/2025 Cella .................. G06Q 30/0201
2021/0248338 A1 8/2021 Spivack et al.
2021/0256070 A1 8/2021 Tran et al.
2021/0281410 A1 9/2021 Hain
2022/0029464 A1 1/2022 Smith et al.
2022/0040557 A1 2/2022 Tran
(Continued)

FOREIGN PATENT DOCUMENTS

AU 2022242898 A1 10/2023
CA 3177410 A1 6/2022
(Continued)

OTHER PUBLICATIONS

Battah et al., "Blockchain and NFTs for Trusted Ownership,Trading, and Access of AI Models", 2022, IEEE Access, vol. 10, pp. 112230-112249. (Year: 2022).*
(Continued)

*Primary Examiner* — Ted T. Vo
(74) *Attorney, Agent, or Firm* — Banner & Witcoff, Ltd.

(57) ABSTRACT

Systems and methods are disclosed for executing large quantum programs efficiently and securely. It breaks down programs into small, logical components, leveraging run-time analysis and AI-driven labeling. These components are then deployed across distributed quantum hardware nodes based on factors like noise levels, capabilities, and geolocation, optimized by a deep learning engine. Ownership and deployment paths are tracked using non-fungible tokens (NFTs) on a blockchain network, ensuring security and transparency. Outputs from each node are validated and aggregated based on their NFT linkage, resulting in accurate and reliable program results. This distributed quantum DevOps framework promotes scalability, performance optimization, and secure management, accelerating the development and application of quantum computing across diverse fields.

20 Claims, 5 Drawing Sheets

(56) References Cited

U.S. PATENT DOCUMENTS

| | | | |
|---|---|---|---|
| 2022/0261882 A1 | 8/2022 | Youb et al. |
| 2022/0343768 A1 | 10/2022 | Di Cosola |
| 2023/0120897 A1 | 4/2023 | Kozlowski, III |
| 2023/0122552 A1 | 4/2023 | Meyers et al. |
| 2023/0154266 A1 | 5/2023 | Carter |
| 2023/0230054 A1 | 7/2023 | Livesay |

FOREIGN PATENT DOCUMENTS

| | | |
|---|---|---|
| WO | 2021219869 A2 | 11/2021 |
| WO | 2021260674 A1 | 12/2021 |
| WO | 2022101515 A1 | 5/2022 |
| WO | 2022261139 A1 | 12/2022 |
| WO | 2023064933 A1 | 4/2023 |

OTHER PUBLICATIONS

Wikipedia, "Non-Fungible token", 2023, retrieved from https://en.wikipedia.org/wiki/Non-fungible_token, 24 pages. (Year: 2023).*

Chiacchio, "A Non-Fungible Token Solution for the Track and Trace of Pharmaceutical Supply Chain", 2022, MDPI, 23 pages. (Year: 2022).*

Pandey et al., "Efficient quantum non-fungible tokens for blockchain", 2022, arXiv, 8 pages. (Year: 2022).*

Mutter et al., "Fingerprints of Qubit Noise in Transient Cavity Transmission", 2022, arXiv, 6 pages. (Year: 2022).*

* cited by examiner

| Quatum Program component 500 | Quantum component ID 502 | Functional output 504 | NFT ID 506 | Target Quantum Infrastructure 508 | IP address of Quantum Infra 510 | Geo location of Quantum Infra 512 | Quantum Measurement aggregation sequence 514 |
|---|---|---|---|---|---|---|---|
| Component 1 | QP001 | Function1 | NFT1 | Quantum Hardware-0001 | 10.150.5.120 | x,y,z | 3 |
| Component 2 | QP002 | Function2 | NFT2 | Quantum Hardware-0002 | 10.150.5.120 | x,y,z | 1 |
| Component 3 | QP003 | Function3 | NFT2 | Quantum Hardware-0003 | 10.150.5.120 | x,y,z | 2 |
| Component 4 | QP004 | Function4 | NFT4 | Quantum Hardware-0004 | 10.150.5.120 | x,y,z | 5 |
| Component 5 | QP005 | Function5 | NFT4 | Quantum Hardware-0005 | 10.150.5.120 | x,y,z | 4 |
| Component 6 | QP006 | Function6 | NFT4 | Quantum Hardware-0006 | 10.150.5.120 | x,y,z | 6 |

FIG. 5

DISTRIBUTED QUANTUM COMPUTING WITH BLOCKCHAIN

TECHNICAL FIELD

The present disclosure relates to quantum computing, specifically focusing on distributed quantum program development, execution, and optimization. It leverages blockchain technology and non-fungible tokens (NFTs) for secure management and deployment of quantum program components across distributed quantum hardware environments.

DESCRIPTION OF THE RELATED ART

Developing a secure Quantum DevOps framework for distributed hardware is an important challenge in the emerging field of quantum computing. As the demand for quantum computing grows, so will the need for efficient and secure ways to manage, orchestrate, and execute complex quantum programs across multiple hardware platforms. Here are some key aspects of this challenge:

Sample security issues include: (a) Qubit privacy: Ensuring that sensitive quantum data (qubit states) remains confidential during program execution across geographically distributed hardware. (b) Hardware authentication: Verifying the identity and integrity of individual quantum processors in the network to prevent tampering or manipulation. (c) Quantum communication security: Protecting quantum information transmission from eavesdropping or interception during communication between nodes. (d) Quantum error correction: Implementing robust mechanisms to mitigate errors and maintain the integrity of the quantum program execution.

Sample DevOps issues include: (a) Heterogeneity: Addressing the diverse capabilities and architectures of different quantum hardware platforms. (b) Scalability: Designing frameworks that can efficiently manage and orchestrate programs across large networks of quantum processors. (c) Standardization: Establishing common protocols and interfaces for communication and resource management across different hardware platforms. (d) Tooling and automation: Developing specialized tools and automation routines for tasks like quantum program compilation, optimization, and deployment.

The development of a secure Quantum DevOps framework is a complex task and there is a need for an intelligent distributed quantum computing DevOps apparatus that can leverage blockchain technology.

SUMMARY OF THE INVENTION

In accordance with one or more arrangements of the non-limiting sample disclosures contained herein, solutions are provided to address one or more issues by providing, inter alia, (a) Runtime Analysis & Distributed Execution: Analyzes large quantum programs at runtime, automatically breaks them down, and deploys components to distributed quantum hardware via blockchain technology; (b) NFT-based Program Component Management: Mints and manages quantum program components as NFTs on a blockchain, ensuring secure ownership and execution tracking; (c) Hardware Node Optimization & Geolocation: Identifies and maps distributed quantum hardware locations and capabilities, optimizing program distribution for noise reduction and data loss; (d) Smart Contract-managed Output Aggregation: Uses smart contracts on the blockchain to validate and aggregate outputs from various distributed hardware nodes based on NFT-linked execution paths; and (e) Quantum DevOps Orchestration: Orchestrates the deployment of program components and aggregates their outputs based on a pre-defined sequence generated by a classical computing apparatus.

Sample benefits of the foregoing include: (a) Scalability: Enables efficient development and deployment of large quantum programs across distributed hardware; (b) Security & Transparency: Provides secure ownership and execution tracking through blockchain-based NFTs and smart contracts; (c) Performance Optimization: Minimizes noise and data loss during program execution through hardware-aware distribution; and (d) Simplified Workflow: Automates program analysis, component selection, and deployment, reducing development complexity.

The disclosures provided herein offer a novel framework for distributed quantum program development and execution, addressing key challenges in scalability, security, and performance optimization.

More specifically, the inventions disclosed herein address several key problems in this evolving field: 1. Efficient execution of large quantum programs: By breaking down large programs into smaller, logical components and distributing them across available hardware, the invention tackles the challenge of efficiently running complex quantum computations on limited resources. 2. Optimized hardware utilization: The use of generative AI and geolocation considerations in hardware selection ensures that program components are deployed on the most suitable hardware nodes based on factors like capability, noise levels, and physical location, maximizing performance and minimizing errors. 3. Secure and transparent management: Utilizing blockchain technology and smart contracts provides a secure and transparent platform for managing program components, ownership rights, and deployment paths. This eliminates the risk of unauthorized access or manipulation of critical data. 4. Fault tolerance and error handling: While not explicitly mentioned in the diagrams, the invention's emphasis on component-based execution and distributed hardware implies potential for greater fault tolerance and error handling compared to traditional monolithic program execution. 5. Scalability and future-proofing: The invention lays the groundwork for scaling quantum computing to handle more complex programs and larger datasets by enabling efficient resource allocation and distributed execution. This prepares the infrastructure for future advancements in quantum hardware and algorithms.

Overall, the invention tackles the major challenges of executing large, complex quantum programs in a secure, efficient, and scalable manner. It has the potential to significantly accelerate the development and application of quantum computing across various fields.

The inventions disclosed herein address these problems in various ways such as the following. 1. Runtime analysis and annotation: This automatically identifies functional parts of the program, reducing manual effort and errors. 2. NFT-based ownership and mapping: This ensures secure tracking of components and their paths, preventing unauthorized access or manipulation. 3. Distributed hardware optimization: This minimizes noise and data loss during transmission and improves overall program performance.4. Validated and aggregated output: This ensures accurate and reliable program results through component verification and proper execution sequencing.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an intelligent method is utilized in which large quantum program components/circuits are analyzed at run time during development and broken down, indexed/annotated automatically based on functional output or expectation, and deployed to distributed quantum hardware leveraging blockchain technology.

In some arrangements, auto-selected quantum program components/circuits based on functional output are minted to non-fungible tokens (NFTs) managed by smart contract(s) hosted in blockchain network(s).

In some arrangements, quantum program components/circuits are packaged and distributed to various distributed computing environment/infrastructure in a way to optimize computational noise and data loss on transmission.

In some arrangements, geolocation is utilized to identify quantum computing hardware and its capability to generate distributed quantum hardware node schema leveraging generative AI.

In some arrangements, minted programs component NFT can include proof of ownership on program component and target hardware path where the program component is the target to get deployed.

In some arrangements, at point of use on classical computing hardware, program components output are validated and aggregated based on NFT validation.

In some arrangements, chain(s) of NFTs can act as a blueprint to aggregate program components output from target distributed hardware and can be managed by smart contract(s).

In some arrangements, a quantum DevOps classical computing apparatus generates schema of distributed computing hardware node and orchestrates deployment of auto-selected program components/circuits.

In some arrangements, output from each distributed hardware node can be aggregated in a sequence that is defined by DevOps classical computing apparatus.

In some arrangements, a method for a distributed, quantum computing system for executing large quantum programs securely with blockchain technology, can comprise one or more steps such as:

a. analyzing, by a quantum program analyzer engine, a quantum program at runtime to identify program components;
b. selecting, by a distributed quantum node schema, distributed quantum hardware environments for the program components based on factors including noise levels, transmission lost estimates, and geographical distances to a classical-computing source location from the distributed quantum hardware environments;
c. generating, by an NFT generator engine, non-fungible tokens (NFTs) for the program components;
d. mapping, in the NFTs by an NFT program mapping engine, deployment paths for the program components to the distributed quantum hardware environments that were selected and ownership information for the quantum program;
e. storing, in an NFT quantum program repository, the NFTs in a blockchain network;
f. deploying, by a quantum program deployment engine, the program components to the distributed quantum hardware environments via optical fibers;
g. collecting and aggregating, by a quantum program output aggregation engine, outputs from distributed quantum hardware environments corresponding to the program components;
h. combining, by a classical computing infrastructure, the outputs to produce a final program result;
i. validating, by the classical computing infrastructure, the final program result based on a smart contract for the NFTs in the blockchain network.

In some arrangements, the smart contract validates the deployment paths and ensures authorized execution of the program components based on the ownership information.

In some arrangements, the distributed quantum hardware environments are quantum nodes.

In some arrangements, the outputs are collected and aggregated based on an NFT linkage in order to ensure proper sequence and accuracy.

In some arrangements, the factors also include qubit processing costs of differing quantum computers that have differing said noise levels.

In some arrangements, the program components are deployed in the quantum nodes over an encrypted cloud infrastructure via the optical fibers.

In some arrangements, the outputs are validated and aggregated at a point of use on the classical computing infrastructure.

In some arrangements, the outputs are aggregated in a sequence which is defined by the classical computing infrastructure.

In some arrangements, the method can also include the steps of:

a. performing, by a deep learning engine, deep learning on the program components to generate DevOps data; and
b. utilizing, in the distributed quantum node schema, the DevOps data to select the distributed quantum hardware environments.

In some arrangements, the deep learning uses artificial intelligence (AI) to automatically identify the program components in the quantum program.

In some arrangements, the deep learning uses a deep learning model for optimizing hardware selection based on program requirements and hardware characteristics.

In some arrangements, the deep learning model is trained on a first dataset of hardware performance characteristics of the differing quantum computers.

In some arrangements, the deep learning model is trained on a second dataset of requirements for the quantum program.

In some arrangements, the program components are executed in parallel across the distributed quantum hardware environments.

In some arrangements, the blockchain network stores and manages the NFTs and facilitates secure deployment of the program components.

In some arrangements, wherein the geographical distances are determined based on physical lengths of network wiring from the source the quantum nodes over the deployment paths.

In some arrangements, further comprising the step of utilizing a feedback loop to learn from the outputs in order to optimize the deep learning engine.

In some arrangements, a method for optimizing execution of a large quantum program on a distributed quantum hardware environment can comprise steps such as:

a. identifying program components through runtime analysis;

b. generating NFTs for each of said program components and associating the program components with ownership and deployment path information;

c. utilizing a deep learning model to analyze quantum hardware capabilities including noise and geolocation data; and d. selecting optimal deployment quantum nodes for each of said program components based on the deep learning analysis.

In some arrangements, the geolocation data is based on physical lengths of network wiring for the deployment path information.

In some arrangements, a non-fungible token (NFT) can be utilized for identifying and managing a functional subcomponent of a large quantum program and can include: a) a unique identifier for the functional subcomponent; b) ownership information associated with the functional subcomponent; and c) deployment path information indicating an optimal distributed hardware environment for the subcomponent.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 5 depicts a quantum program component orchestration on quantum hardware in accordance with one or more aspects of this disclosure.

DETAILED DESCRIPTION

Figure 1:
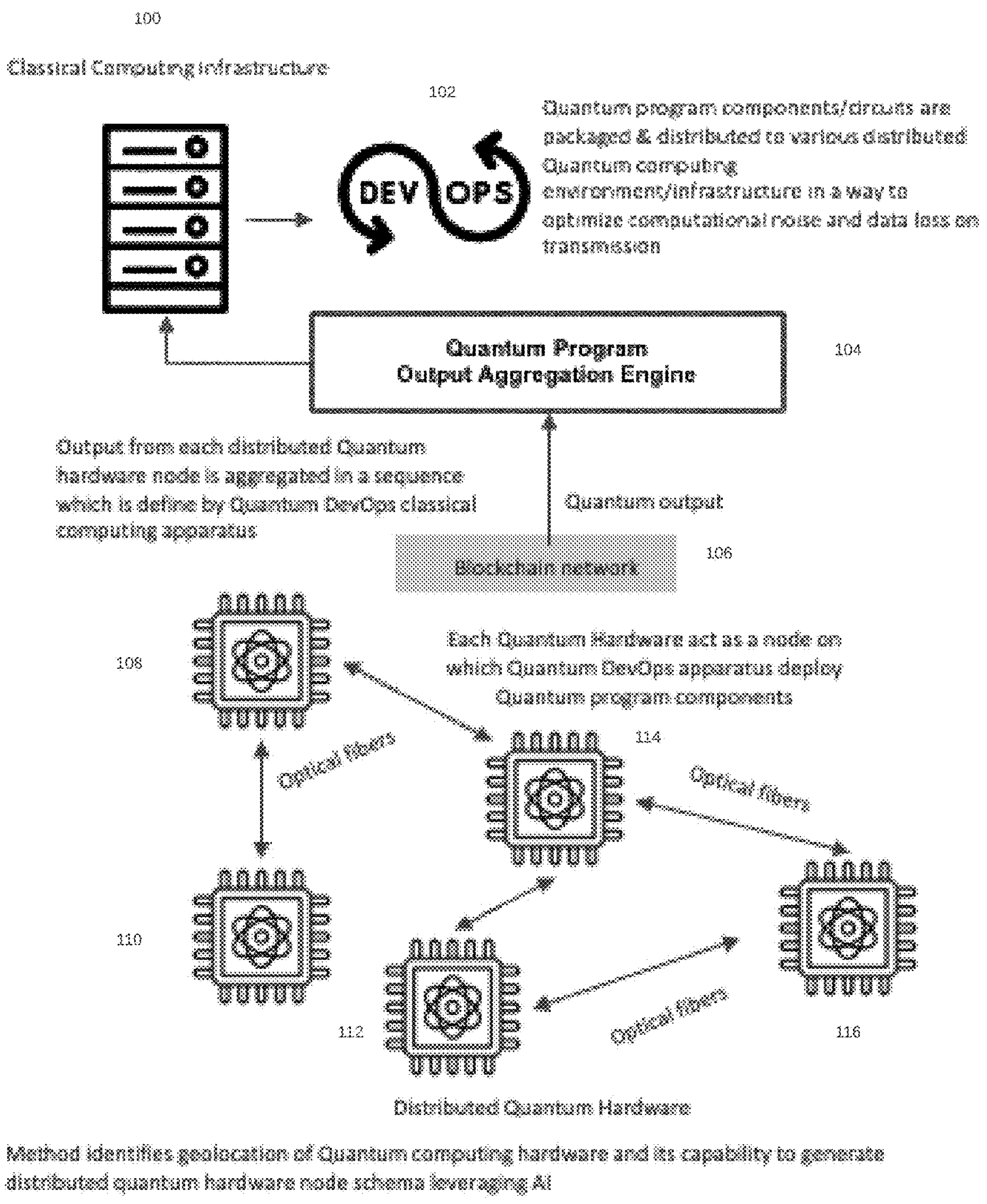
FIG. 1 depicts a functional architecture and flow diagram showing sample concepts, interactions, interfaces, steps, functions, and components of a system and process for a distributed quantum computing DevOps apparatus leveraging blockchain technology in accordance with one or more aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), quantum circuits, quantum computing, servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a functional architecture and flow diagram showing sample concepts, interactions, interfaces, steps, functions, and components of a system and process for a distributed quantum computing DevOps apparatus leveraging blockchain technology in accordance with one or more aspects of this disclosure.

FIG. 1 provides a visual representation of the distributed quantum computing DevOps apparatus. The diagram outlines sample components of an exemplary system, including the quantum program analyzer, NFT generator, distributed hardware nodes, and output aggregation engine. The connections between these components and the flow of data are represented.

In traditional computing, teams are often developing code and deploying programs within the same infrastructure that houses DevOps. However, in quantum computing, quantum hardware is separate from an organization's traditional programming environment.

When a program is written, it is deployed on quantum hardware. The quantum computer runs that particular circuit or program, measures its output, and then sends that output back to the classical computing hardware. Thus, in the quantum world, what is happening is a hybrid system. There is a classical system in which programming occurs, and a program is then deployed for execution on quantum hardware, and the results are returned to the classical system.

Various aspects of this disclosure address this DevOps and distributed quantum computing setup. This is important because companies do not have their own internal quantum hardware because quantum hardware requires cryogenic conditions and lab setup. Costs are significant as well. This results in the hybrid system structure and therefore requires management and setup as described herein.

As a result, quantum computing is utilized a quantum-as-a-service. Since companies do not have their own quantum hardware on their premises, programs are written in a DevOps environment, and then the program is pushed into quantum computing hardware, which is distributed geographically. Notably, each hardware has its own set of capabilities; for example, some hardware may have higher accuracy with fewer errors (e.g., noise) but may be more expensive than other hardware with different performance characteristics that costs less.

In quantum computing, "noise" refers to unwanted perturbations that disrupt the delicate quantum states of qubits, introducing errors and compromising the accuracy of calculations. These errors can occur from various internal sources such as: Manufacturing imperfections: Imperfectly constructed qubits or control hardware can lead to leaks in their quantum states, causing them to decohere (lose their superposition) and contribute to errors; Thermal fluctuations: Even at extremely low thermal levels, residual thermal vibrations can subtly affect the energy levels of qubits, causing transitions and errors; and Crosstalk: Interactions between neighboring qubits can cause their states to become entangled, leading to unwanted correlations and affecting computation. Similarly, these errors can occur from various external sources such as: Electromagnetic interference: Stray electromagnetic fields, even from nearby electronic devices, can interact with qubits and disrupt their delicate states; Vibrations: Mechanical vibrations from the environment can introduce small energy changes to qubits, causing errors; and Cosmic rays: High-energy particles from space can collide with qubits and knock them out of their intended states.

Measuring noise level in quantum computing is more complex than in classical computing. We can't directly "read" the state of a qubit with perfect accuracy, as doing so introduces its own kind of disturbance. Instead, the error rate can be measured, which is the probability of an error occurring during a specific quantum operation. A common metric for noise level is the fidelity, which quantifies the similarity between the intended and actual quantum state of a qubit. A fidelity of 99% means that there's a 1% chance the qubit has flipped to an unintended state due to noise.

As conceptualized in FIG. 1, a controlled procedure can be used for deploying a quantum program to quantum hardware in a controlled manner, and the output of that environment can then be aggregated back to a classical system. A large program can be divided, and then each component of the program is delivered or targeted to a specific quantum hardware that is distributed geographically. The output is measured and is aggregated before returning to the traditional system.

A blockchain procedure can be utilized in the procedure because it can track what quantum hardware was selected, which program component was deployed to it, etc. This is important because some program components may require more precision and less noise and thus require more expensive processing at a first quantum computing system (e.g., which may charge $100/qubit), whereas other program components are more tolerant and suitable output may be obtained from a second quantum computing system that is cheaper (e.g., which may charge only $50/qubit). Thus, it is important to make sure that the only program that is validated and owned by some authority is the one that is pushed into the system. At random, no one inside the DevOps platform is attempting to run a program on quantum hardware. Only programs that have been validated, owned, and have some valid ownership are deployed in the quantum hardware.

As a result, large quantum programs are broken down into small components and these are analyzed at runtime. In a DevOps environment, when a programmer writes into an integrated development environment, the quantum program is where the AI system understands that particular code and logically breaks that code down into small components, and then decides which components need to go to which hardware. The method can auto select a quantum program component based on its functional output. When a programmer writes a piece of code, the system mints that particular code into an NFT token.

The reason for the NFT token is that it provides ownership of the program. Now, once the output of the quantum program is measured and then delivered back to classical computing, that implementation of that particular output on classical computing will only be deployed when it is validated by this NFT token.

As referenced above, quantum program components or circuits are packaged and distributed to various quantum computing hardware. The goal of this distribution is to account for computational noise and data loss during transmission as well as provide cost optimization based on differences in performance and pricing. Quantum hardware is located in different geographical locations and will be linked by optical fibers.

The minting quantum program component and NFT include group ownership. The program is considered to be a digital asset, and that unique digital asset is converted into an NFT token. This ensures ownership of that specific quantum program, and then the program is ready to target a specific hardware path where the quantum program component is targeted to be deployed. And at the point of use, particularly when using classical computing hardware, quantum program components are validated using this NFT token. For security and safety, the quantum computer's output will never be ingested into the classical system if the NFT token fails.

As shown in FIG. 1, classical computing infrastructure 100 is coupled to DevOps 102, which serves as an intermediary system. This system communicates with quantum hardware, and in the middle is a blockchain network where the NFT tokens are minted. Programs can be divided logically using an automated AI-driven labeling of the components or programmer labeling of the components. Once divided, each component is converted into an NFT and the target infrastructure is identified where to deploy those quantum programs. This schema is generated based on complexity, data loss, and latency.

As a result, quantum program components and circuits are packaged and distributed to a quantum computing environment/infrastructure in a way to optimize computational noise and data loss on transmission. The method identifies geolocation of quantum computing hardware and its capacity to generate distributed quantum hardware nodes schema leveraging artificial intelligence. Each quantum hardware acts as a node (e.g. 108-116) on which quantum DevOps apparatus deploy quantum program components. Each program component can be assigned to the appropriate node as the target infrastructure based on cost, computational noise, data loss, etc. Output from each distributed quantum hardware node is aggregated in a sequence which is defined by the quantum DevOps classical computing apparatus. Quantum output is provided from the blockchain network 106 to the quantum program output aggregation engine 104.

Thus, for quantum program analysis and annotation, FIG. 1 illustrates that the analyzer engine performs its function before deployment to the distributed hardware. And for NFT generation and management, FIG. 1 shows the minting of NFTs for program components and their association with smart contracts. Regarding distributed hardware optimization, the diagram illustrates that the system considers factors like geolocation and hardware capabilities when distributing program components. It can utilize optimization algorithms and balance factors like computational power, noise levels, and transmission distances. Lastly, with respect to output validation and aggregation, FIG. 1 shows that outputs from each hardware node are validated and aggregated based on the NFT chain.

Figure 2:
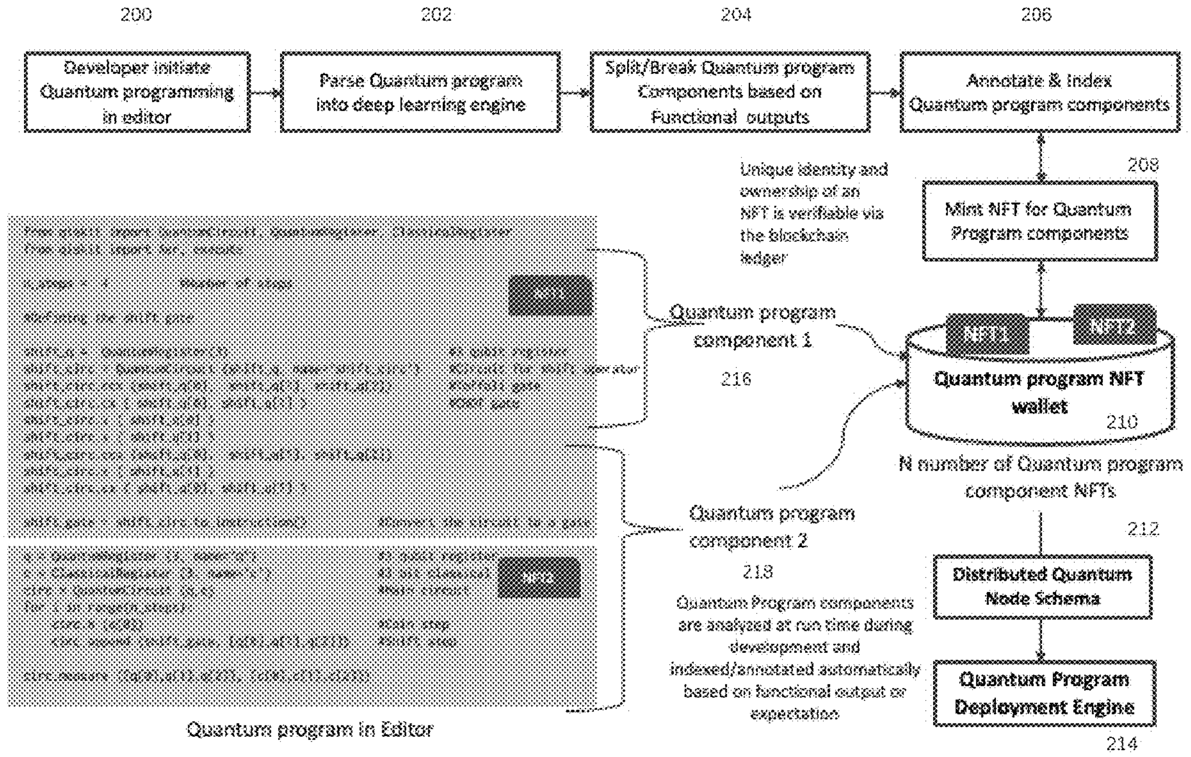
FIG. 2 depicts a functional architecture and flow diagram showing sample concepts, interactions, interfaces, steps, functions, and components of a system and process for a distributed quantum computing DevOps apparatus leveraging blockchain technology in accordance breaking large quantum programs into logical components.

By way of non-limiting disclosure, FIG. 2 depicts a functional architecture and flow diagram showing sample concepts, interactions, interfaces, steps, functions, and components of a system and process for a distributed quantum computing DevOps apparatus leveraging blockchain technology in accordance breaking large quantum programs into logical components.

In 200, a developer initiates quantum programming in an editor. A sample quantum program in the editor is shown in the figure. In 202, the quantum program is parsed into a deep learning engine. The quantum program components are split or broken into parts based on functional outputs in 204. The quantum program components are annotated and indexed in 206. NFTs for quantum program components are minted in 208. Unique identity and ownership of an NFT is verifiable via the blockchain Ledger. A quantum program NFT wallet 210 holds the minted NFTs for the quantum program components. Each quantum program component will have its own NFT. For example, quantum program component 1, which is represented as 216, can correspond to NFT1. Similarly, quantum program component 2, which is represented as 218, can correspond to NFT2. Both of the NFTs can be stored in the quantum program NFT wallet 210.

N number of quantum program component NFTs can be distributed via a quantum node schema in 212 based on the quantum computing factors relevant for the corresponding program components. Quantum program components are analyzed at run time during development and are indexed or annotated automatically based on functional output or expectation and are deployed by quantum program development engine 214.

Figure 3:
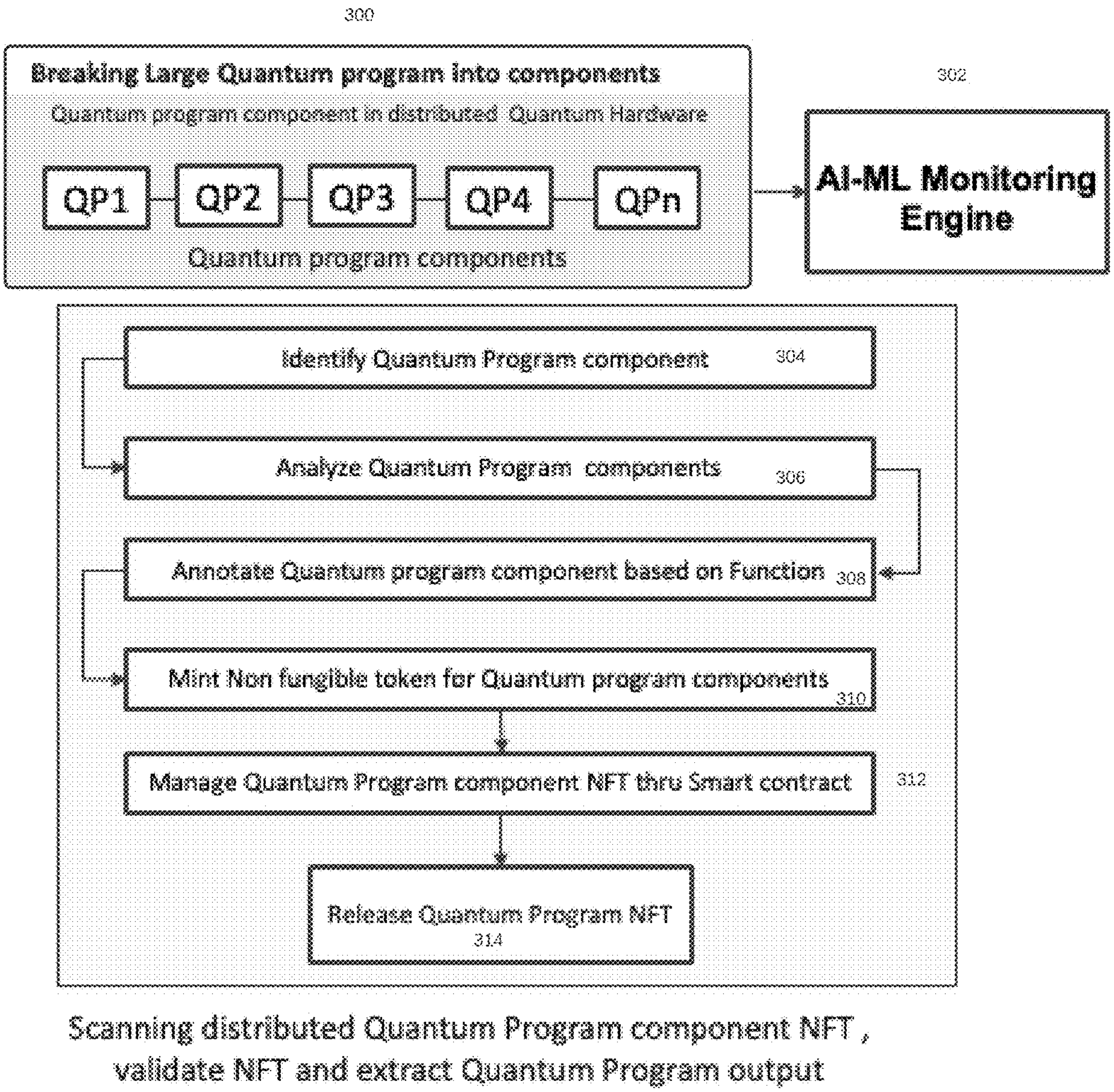
FIG. 3 depicts a functional architecture and flow diagram showing sample concepts, interactions, interfaces, steps, functions, and components of a system and process for a quantum program component distribution engine in accordance with one or more aspects of this disclosure.

By way of non-limiting disclosure, FIG. 3 depicts a functional architecture and flow diagram showing sample concepts, interactions, interfaces, steps, functions, and components of a system and process for a quantum program component distribution engine in accordance with one or more aspects of this disclosure.

In 300, large quantum programs are broken into components QP1, QP2, QP3, QP4 . . . QPN for execution in distributed quantum hardware. They are provided to an artificial intelligence (AI)/machine learning (ML) engine 302. Clustering/grouping large quantum program into logical components is performed based on output functionality. Quantum hardware location is identified to reduce noise and data loss on computation and transmission.

Quantum program components are identified in 304 and analyzed in 306. Quantum program components are annotated based on function in 308. Non fungible tokens (NFTs) are minted for quantum program components in 310. Quantum program component NFTs are managed through smart contracts in 312. Quantum program NFTs are released in 314.

Minted quantum programs component NFT includes proof of ownership on program component and target quantum hardware path where quantum program component is deployed. Quantum program components are distributed to distributed quantum hardware environment at point of use on classical computing hardware quantum program components output are validated and aggregated based on corresponding NFT validation. Thus, a distributed quantum component NFT is scanned, the NFT is validated, and the corresponding quantum program output is extracted.

Figure 4:
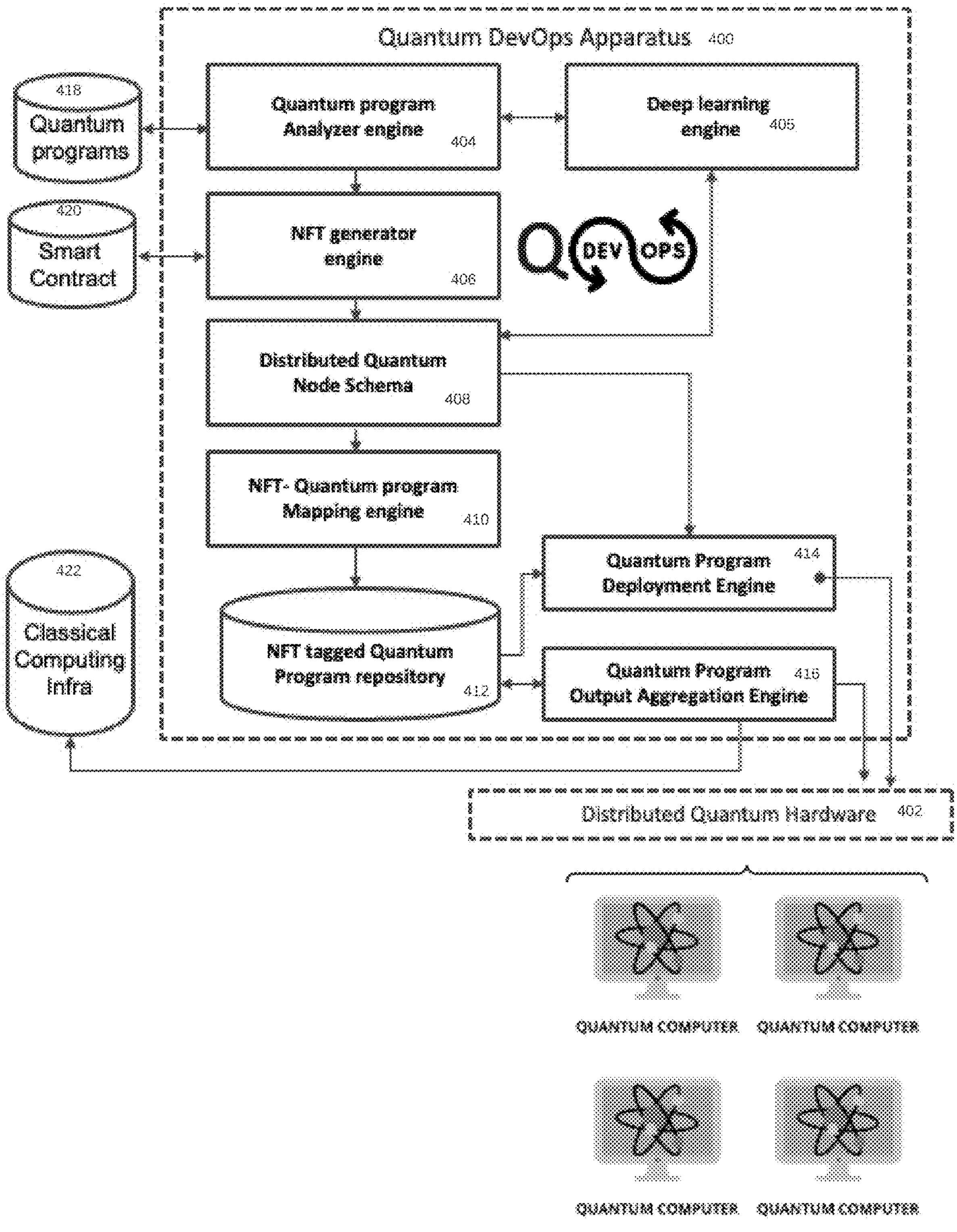
FIG. 4 depicts a functional architecture and flow diagram showing sample concepts, interactions, interfaces, steps, functions, and components of a distributed quantum computing DevOps apparatus in accordance with one or more aspects of this disclosure.

By way of non-limiting disclosure, FIG. 4 depicts a functional architecture and flow diagram showing sample concepts, interactions, interfaces, steps, functions, and components of a distributed quantum computing DevOps apparatus in accordance with one or more aspects of this disclosure.

The distributed quantum computing system is divided into three main sections: (a) Quantum DevOps apparatus 400: This central unit manages the entire workflow, including program analysis, component extraction, deployment, and output aggregation; (b) Distributed Quantum Hardware nodes 402: These represent individual quantum computing units where program components are executed; and (c) Blockchain Network and Smart Contract 420: This provides a secure and transparent platform for managing ownership, deployment paths, and component communication.

At a high level, a quantum program analyzer engine 404 analyzes large quantum programs and breaks them down into smaller, logical components based on functionality.

A quantum program component distribution engine distributes the program components to the optimal hardware nodes based on factors like capability, noise levels, and location (potentially using the information from the Deep Learning Engine).

NFT generator and manager 406 creates and manages non-fungible tokens (NFTs) for each component, tracking ownership and deployment paths.

Distributed quantum node schema 408 determines the optimal schema of the quantum hardware were the system needs to deploy.

Quantum program output aggregation engine 416 combines the outputs from each hardware node into the final program result, ensuring proper sequence and accuracy.

Distributed Quantum Hardware nodes in 402 are individual quantum computing units that execute the program components. Each node has its own IP address and geolocation.

The Blockchain Network and Smart Contract database (e.g., 420) facilitates secure and transparent management of components, ownership rights, and deployment paths. The smart contract enforces rules and ensures data integrity.

As a result, quantum programs 418 are provided to quantum program analyzer engine 404, which provides components to the NFT generator engine 406 as well as to a deep learning engine 405. Output from the deep learning engine can be fed back into the quantum program analyzer engine and can also be fed forward to the distributed quantum node schema 408. Output from the NFT generator engine is similarly provided to the distributed quantum node schema, which is provided to the quantum program mapping engine 410 and the quantum program deployment engine 414.

Output from the quantum program mapping engine is stored in the NFT tagged quantum program repository and provided to the quantum program deployment engine 414 as well as the quantum program output aggregation engine 418, both of which are coupled to the distributed quantum hardware 402.

The foregoing leverages component-based execution, secure blockchain management, and optimized hardware allocation to address the challenges of running large and complex quantum programs efficiently and reliably, which can then be executed on classical computing infrastructure 422.

By way of non-limiting disclosure, FIG. 5 depicts a quantum program component orchestration on quantum hardware in accordance with one or more aspects of this disclosure. The orchestration is illustrated as a table of rows and columns.

Quantum Program component 500 lists the individual components that make up the larger quantum program. Each component has a unique quantum component ID (QP001, QP002, etc.) in column 502.

Function output 504 describes the specific operation or task that each component performs within the overall program.

NFT ID 506 refers to the unique identifier of the non-fungible token associated with each component. NFTs act as ownership certificates and track the deployment path of each component on the quantum hardware.

Target Quantum Hardware 508 specifies the specific quantum hardware node where each component will be executed.

IP address 510 shows the IP address of the target quantum hardware node.

Geo location of Quantum Hardware 512 indicates the geographical location of the quantum hardware node.

Quantum Measurement aggregation sequence 514 defines the order in which the outputs from each component will be combined to form the final result of the program.

In the depicted example in FIG. 5, the quantum program is broken down into six components (QP001 to QP006). Each component is associated with a unique NFT, indicating ownership and deployment path. The components are distributed across three different quantum hardware nodes (Quantum Hardware-0001, Quantum Hardware-0002, and Quantum Hardware-0003). The IP addresses and geographical locations of the hardware nodes are also listed. The final column specifies the order in which the outputs from each component will be combined to produce the final program result.

Overall, this table provides an overview of how the quantum program components are orchestrated and executed on distributed quantum hardware. It highlights the importance of NFTs in tracking ownership and deployment paths, as well as the need for careful consideration of hardware location and capabilities for optimal program execution.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A distributed quantum computing method for executing large quantum programs securely with blockchain technology using development and operations practices comprising the steps of:

- analyzing, by a quantum program analyzer engine, a quantum program at runtime to identify program components;
- selecting, by a distributed quantum node schema, distributed quantum hardware environments for the program components based on factors including noise levels, transmission lost estimates, and geographical distances to a classical-computing source location from the distributed quantum hardware environments;
- generating, by a non-fungible token (NFT) generator engine, NFTs for the program components;
- mapping, in the NFTs by an NFT program mapping engine, deployment paths for the program components to the distributed quantum hardware environments that were selected and ownership information for the quantum program;
- storing, in an NFT quantum program repository, the NFTs in a blockchain network;
- deploying, by a quantum program deployment engine, the program components to the distributed quantum hardware environments via optical fibers;
- collecting and aggregating, by a quantum program output aggregation engine, outputs from distributed quantum hardware environments corresponding to the program components;
- combining, by a classical computing infrastructure, the outputs to produce a final program result; and
- validating, by the classical computing infrastructure, the final program result based on a smart contract for the NFTs in the blockchain network.

2. The method of claim 1 wherein the smart contract validates the deployment paths and ensures authorized execution of the program components based on the ownership information.

3. The method of claim 2 wherein the distributed quantum hardware environments are quantum nodes.

4. The method of claim 3 wherein the outputs are collected and aggregated based on an NFT linkage in order to ensure proper sequence and accuracy.

5. The method of claim 4 wherein the factors also include qubit processing costs of differing quantum computers that have differing said noise levels.

6. The method of claim 5 wherein the program components are deployed in the quantum nodes over an encrypted cloud infrastructure via the optical fibers.

7. The method of claim 6 wherein the outputs are validated and aggregated at a point of use on the classical computing infrastructure.

8. The method of claim 7 wherein the outputs are aggregated in a sequence which is defined by the classical computing infrastructure.

9. The method of claim 8 further comprising the steps of:

- performing, by a deep learning engine, deep learning on the program components to generate development and operations (DevOps) data; and
- utilizing, in the distributed quantum node schema, the DevOps data to select the distributed quantum hardware environments.

10. The method of claim 9 wherein the deep learning uses artificial intelligence (AI) to automatically identify the program components in the quantum program.

11. The method of claim 10 wherein the deep learning uses a deep learning model for optimizing hardware selection based on program requirements and hardware characteristics.

12. The method of claim 11 wherein the deep learning model is trained on a first dataset of hardware performance characteristics of the differing quantum computers.

13. The method of claim 12 wherein the deep learning model is trained on a second dataset of requirements for the quantum program.

14. The method of claim 13 wherein the program components are executed in parallel across the distributed quantum hardware environments.

15. The method of claim 14 wherein the blockchain network stores and manages the NFTs and facilitates secure deployment of the program components.

16. The method of claim 15 wherein the geographical distances are determined based on physical lengths of network wiring from the source the quantum nodes over the deployment paths.

17. The method of claim 16 further comprising the step of utilizing a feedback loop to learn from the outputs in order to optimize the deep learning engine.

18. The method of claim 1, wherein the NFTs comprise a data structure stored on a non-transitory computer-readable storage medium, the data structure comprising: a) a unique identifier for each program component; b) ownership information associated with each program component; and c) deployment path information indicating an optimal distributed hardware environment for each program component based on factors including noise levels of the distributed quantum hardware environments.

19. A method for optimizing execution of a large quantum program on a distributed quantum hardware environment, comprising the steps of:

- identifying program components through runtime analysis of the large quantum program to automatically break down the large quantum program into the program components based on functional outputs;
- generating non-fungible tokens (NFTs) for each of said program components and associating the program components with ownership and deployment path information;
- utilizing a deep learning model to analyze quantum hardware capabilities including noise and geolocation data, wherein the deep learning model is trained on a dataset of hardware performance characteristics including the noise levels of differing quantum computers; and selecting optimal deployment quantum nodes for each of said program components based on the deep learning analysis.

20. The method of claim 19 wherein the geolocation data is based on physical lengths of network wiring for the deployment path information.

* * * * *